(12) United States Patent
O'Brien (10) Patent No.: US 10,672,311 B2
(45) Date of Patent: Jun. 2, 2020

(54) HEAD TRACKING BASED DEPTH FUSION

(71) Applicant: PURE DEPTH INC., Auckland (NZ)

(72) Inventor: Austin F. O'Brien, Auckland (NZ)

(73) Assignee: Pure Depth, Inc. (NZ)

( * ) Notice: Subject to any disclaimer, the term of this patent is extended or adjusted under 35 U.S.C. 154(b) by 77 days.

(21) Appl. No.: 15/969,984

(22) Filed: May 3, 2018

(65) Prior Publication Data

US 2018/0322818 A1 Nov. 8, 2018

Related U.S. Application Data

(60) Provisional application No. 62/501,524, filed on May 4, 2017.

(51) Int. Cl.
| | |
|---|---|
| *G06T 15/00* | (2011.01) |
| *G09G 3/00* | (2006.01) |
| *H04N 13/128* | (2018.01) |
| *H04N 13/395* | (2018.01) |
| *H04N 13/383* | (2018.01) |
| *G09G 3/36* | (2006.01) |
| *H04N 13/366* | (2018.01) |
| *G09G 3/3208* | (2016.01) |

(52) U.S. Cl.
CPC ............ *G09G 3/003* (2013.01); *G06T 15/005* (2013.01); *H04N 13/128* (2018.05); *H04N 13/383* (2018.05); *H04N 13/395* (2018.05); *G09G 3/3208* (2013.01); *G09G 3/36* (2013.01); *G09G 2300/023* (2013.01); *G09G 2320/028* (2013.01); *G09G 2380/10* (2013.01); *H04N 13/366* (2018.05); *H04N 2213/002* (2013.01)

(58) Field of Classification Search
None
See application file for complete search history.

(56) References Cited

U.S. PATENT DOCUMENTS

| | | | |
|---|---|---|---|
| 2007/0035561 A1 | 2/2007 | Bachelder et al. | |
| 2009/0135090 A1* | 5/2009 | Kim | G09G 3/003 |
| | | | 345/6 |
| 2011/0084893 A1* | 4/2011 | Lee | G06F 1/1649 |
| | | | 345/6 |
| 2011/0175902 A1* | 7/2011 | Mahowald | H04N 13/395 |
| | | | 345/419 |
| 2011/0310121 A1 | 12/2011 | Baron | |
| 2013/0162766 A1 | 6/2013 | Cohen | |
| 2014/0306954 A1* | 10/2014 | Kao | G06T 17/00 |
| | | | 345/420 |
| 2015/0145977 A1* | 5/2015 | Hoffman | H04N 13/302 |
| | | | 348/59 |
| 2015/0309571 A1 | 10/2015 | Cheng et al. | |
| 2015/0339844 A1* | 11/2015 | Liu | G06T 15/20 |
| | | | 345/419 |
| 2016/0260258 A1* | 9/2016 | Lo | G06T 7/00 |
| 2016/0321841 A1 | 11/2016 | Christen et al. | |

(Continued)

*Primary Examiner* — Anh-Tuan V Nguyen
(74) *Attorney, Agent, or Firm* — Craig A. Baldwin (57) ABSTRACT

A multi-layer display (MLD) system may include a plurality of display screens including at least first and second display screens arranged in a substantially parallel and overlapping manner, and a processing system comprising at least one processor and memory. The processing system may be configured to render content on and between two MLD layers, such that the content is correctly rendered from the perspective angle of the viewer.

16 Claims, 10 Drawing Sheets

(56) References Cited

U.S. PATENT DOCUMENTS

2017/0200009 A1\* 7/2017 Bertolet ................ G06F 21/575
2017/0310956 A1\* 10/2017 Perdices-Gonzalez ......................
                                                          H04N 13/366
2018/0184074 A1\* 6/2018 Hunter .................... G06F 3/147

\* cited by examiner

HEAD TRACKING BASED DEPTH FUSION

CROSS REFERENCE TO RELATED APPLICATIONS

This application claims the benefit of priority to U.S. Provisional Patent Application No. 62/501,524 filed on May 4, 2017, the entire contents of which is hereby incorporated by reference.

BACKGROUND

This disclosure relates generally to displays and, more particularly, to display systems and methods for displaying images on multi-layer displays.

Image displays limited to a single two dimensional display lack depth information. To relay depth information of objects, there have been efforts to provide displays that can display the objects in three-dimensions. For example, stereo displays convey depth information by displaying offset images that are displayed separately to the left and right eye. However, stereo displays are limited as to from what angle an observer may view the display. In addition, stereo displays may cause various discomforting symptoms, such as eye strain, blurred vision, and double vision.

Multi-layer displays have also been developed to display objects with a realistic perception of depth. Multi-layered display (MLD) systems are becoming popular for several applications such as for vehicle dashboards, game machines, handheld devices and the like. MLD systems can be configured to display images of scenes so that depth can be represented by distributing objects to be displayed on to the separate display panels of the MLD. Example MLD systems are described in U.S. patent application Ser. No. 15/359,732 filed on Nov. 23, 2016, the contents of which is incorporated herein in its entirety.

In some display techniques, when developing MLD-based content that appears to exist between the discrete layered displays, content often 'breaks' due to positionally identical content not lining up. This is caused by the physical depth of the displays and inherent parallaxing from such a construction. By moving and resizing content when it exists 'between the layers' in this fashion, a rough solution can be built, however such rough solutions suffer from sweet spots—and may break when the user views the content from even a slight variant angle from normal.

SUMMARY

Exemplary embodiments provide a display system that can provide visual depth information using a multi-layer display including two or more display screens (e.g., LCDs) and/or layers provided in a stacked arrangement with improved viewability. Visual depth information of displayed objects may be provided by displaying corresponding gradients on multiple display screens. Improved viewability may be provided by rendering the content from the viewer's perspective, and then skewing it via their projection matrices. The goal is to render content on the two MLD layers, such that the content is correctly rendered from the perspective angle of the viewer, and appears to exist on and between the two MLD layers.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

MLD systems include multiple separate display screens (also referred to as display layers or display panels). As described in the above incorporated patent application, an observer views a composite image of a scene displayed on the MLD system, whereas the composite image is the visual appearance to the observer of separate images of various portions of the scene displayed on respective display screens of the MLD system. To resolve issues with creating content that appears between layers when viewed off angle, in example embodiments, head tracking is employed to algorithmically and automatically correctly project content to appear to exist between layers without sweet spots. A sweet spot, as used herein, is a position and/or an area from which an image on the MLD is visible with sufficient (e.g., above a predetermined level of) clarity and/or quality. The number of, and the respective sizes of, sweet spots differ based on particular parameters of the displays.

Example embodiments provide for rendering content to appear on and between two MLD layers, such that the content is correctly rendered from the perspective angle of the viewer. To achieve this, the content is both rendered from the viewer's perspective, and then skewed via their projection matrices. Example embodiments of the present disclosure detect head and/or eye position of the viewer, and accordingly adjusts display of one or more images displayed on the respective display screens to correctly render image content to appear on and between respective layers of the MLD from the perspective angle of the viewer even in the presence of head and/or eye movements.

Figure 1:
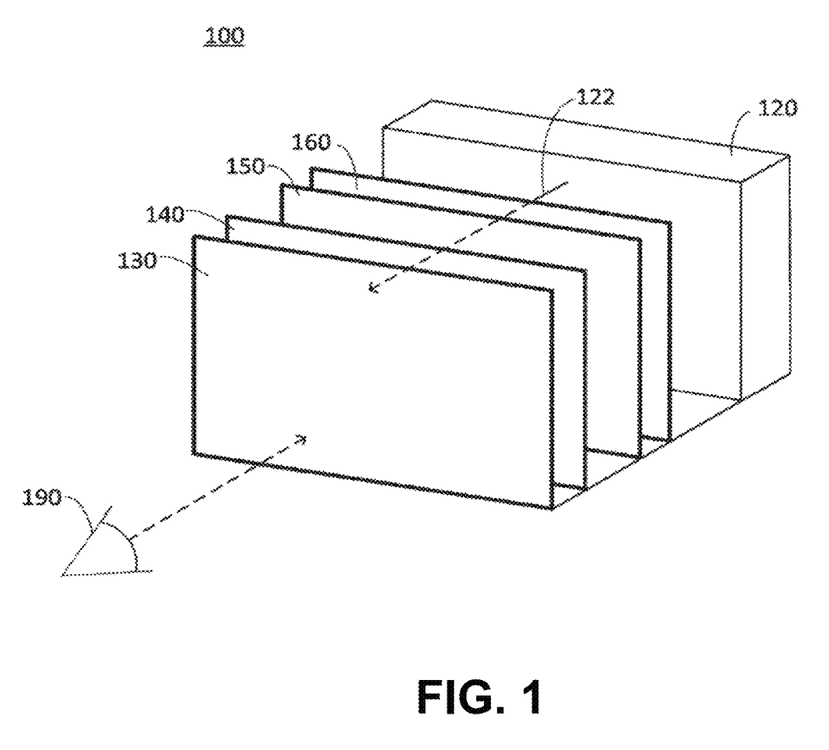
FIG. 1 schematically illustrates a multi-layered display according to some example embodiments of the present disclosure.

FIG. 1 illustrates a MLD system 100 according to some example embodiments of the present disclosure. The display system 100 may include a light source 120 (e.g., rear mounted light source, side mounted light source, optionally with a light guide), and a plurality of display screens 130-160. The display screens 130-160 may be disposed substantially parallel or parallel to each other and/or a surface (e.g., light guide) of the light source 120 in an overlapping manner. In one embodiment, the light source 120 and the display screens 130-160 may be disposed in a common housing. It will be understood that, in some example embodiments, MLD 100 may include only two display screens, and may or may not include a light source 120 (e.g., a light source may be external to the housing of the MLD system). The MLD 100 may be provided at the dashboard of a vehicle in some example embodiments of this disclosure, in order to show the viewer (observer) images such as a speedometer, gauges such as oil pressure or fuel level gauges, navigation, etc. It should be appreciated that the elements illustrated in the figures are not drawn to scale, and thus, may comprise different shapes, sizes, etc. in other embodiments. It should also be appreciated that vehicular dashboard are only one application for MLD systems, and that the use of MLD systems as displays for portable devices, game displays, advertising displays, etc. are contemplated in various embodiments.

In an example application of displaying a three dimensional 3D effect using an MLD system, the MLD system 100 may display graphical information to a viewer/observer 190, such as an operator or passenger of a vehicle, by displaying information including a gradient on two, three, or more of the display screens 130-160 simultaneously. To mimic depth cues of the displayed object, portions of the same object can be displayed with different gradients of a given color or the like on different display screens 130-160. For example, each of the display screen 130-160 may be controlled to display a different portion of a gauge and/or needle found in a traditional vehicle instrument panel. In certain embodiments, each of the display screen 130-160 may be controlled to display a different portion of an image (e.g., clock, gauge and/or needle(s)) of a watch device to be worn on the wrist of a user, or the like. In one example application of display system 100, gradients can be used to better show sloped/inclined surfaces to a viewer in a three dimensional manner using display system 100. An example gradient would fade from an opaque-appearing color (e.g. light grey) to a color (e.g. dark grey) on the display layers closest to the viewer, and an overlapping gradient in the opposite direction on the rear-most layers, in order to better show a three dimensional image of a shape (e.g., speedometer rims or RPM needle, etc.) to an operator of the vehicle, or vice versa. For instance, a main body of a needle may be an opaque-appearing color (e.g., light grey) as shown by the display panel 130 closest to the viewer, and sides or edges of the needle may get progressively more transparent (e.g., darker grey) in display panels 140, 150 giving the appearance of the surface sloping further rearward away from the viewer in depth, and this gradation may be terminated on the rear-most display panel 160 by either a contrasting outer edge or a an opposite overlapping gradient to that which is displayed on the closer display panels 130, 140, 150. Another example gradient could be used to display the rim around a gauge needle, and would fade the rim color from an opaque color (e.g., light grey) at the front of the display apparatus to a transparent color (e.g., dark grey) at or near the rear of the display apparatus (or vice versa), in order to better show a three dimensional image of the rim to an operator of the vehicle. For instance, a portion of the rim closest to the viewer may be an opaque color (e.g., light grey) as shown by the display panel 130 closest to the viewer, and the body of the rim sloping rearward may get progressively more transparent in display panels 140, 150 moving further rearward away from the viewer. In the same gradient region, an opposite overlapping gradient may be rendered on the rear-most display panel 160 with an opaque color appearing where the transparent color appears on the front layer, and fading to transparent color in the opposite direction to the gradient on the closest display panel 130. Of course, the gradient could be arranged in the opposite manner for the rim, so that the transparent color (e.g., dark grey or black) is for the portion of the rim closest to the viewer and the most opaque color (e.g., light grey) is for the portion of the rim farthest from the viewer. The gradients above refer, for example, to dark and light colors forming gradients, where for example the lightest color may be at the center of an object displayed by a first panel and a darkest or darker color may be provided at an outer part of the object for another panel (or vice versa). The lighter color is generally desired to be opaque or substantially opaque, while the darker color may or may not be transparent or substantially transparent from the point of view of the viewer. In some instances of the display system 100 featuring a different color mode, the darker color may be desired to be opaque or substantially opaque, while the lighter color may or may not be transparent or substantially transparent from the point of view of the viewer.

The light source 120 may be configured to provide illumination for the display system 100. The light source 120 may provide substantially collimated light 122 that is transmitted through the display screens 130-160. Optionally, the light source 120 may provide highly collimated light using high brightness LED's that provide for a near point source. The LED point sources may include pre-collimating optics providing a sharply defined and/or evenly illuminated reflection from their emission areas. The light source 120 may include reflective collimated surfaces such as parabolic mirrors and/or parabolic concentrators. In one embodiment, the light source 120 may include refractive surfaces such as convex lenses in front of the point source. However, the LEDs may be edge mounted and direct light through a light guide which in turn directs the light toward the display panels in certain example embodiments.

Each of the display panels/screens 130-160 may include a liquid crystal display (LCD) matrix. Screens are usually stacked LCD layers within a single pair of cross polarizers on the external facing surfaces if the panels are LCD or just stacked with transparent LED or OLED technologies. The rear most display layer may be a non-transparent technology. The LCD layers may be Twisted Nematic+Film, Vertically aligned, Patterned Vertical Alignment, in plane switching, Transparent OLED, Transparent Direct View Micro LED Displays. Alternatively, the display screens 130-160 may include organic light emitting diode (OLED) displays, transparent light emitting diode (TOLED) displays, cathode ray tube (CRT) displays, field emission displays (FEDs), field sequential display or projection displays. In one example embodiment, the display panels 130-160 may be combinations of either full color RGB, RGBW or monochrome panels. The display screens 130-160 are not limited to the listed display technologies and may include other display technologies that allows for the projection of light. In one embodiment, the light may be provided by a projection type system including a light source and one or more lenses and/or a transmissive or reflective LCD matrix.

In one embodiment, each of the display screens 130-160 may be approximately the same size and have a planar surface that is parallel or substantially parallel to one another. In another embodiment, one or more of the display screens 130-160 may have a curved surface. In one embodiment, one or more of the display screens 130-160 may be displaced from the other display screens such that a portion of the display screen is not overlapped and/or is not overlapping another display screen.

Each of the display screens 130-160 may be displaced an equal distance from each other in example embodiments. In another embodiment, the display screens 130-160 may be provided at different distances from each other. For example, a second display screen 140 may be displaced from the first display screen 130 a first distance, and a third display screen 150 may be displaced from the second display screen 140 a second distance that is greater than the first distance. The fourth display screen 160 may be displaced from the third display screen 150 a third distance that is equal to the first distance, equal to the second distance, or different from the first and second distances.

The display screens 130-160 may be configured to display graphical information for viewing by the observer 190. The viewer/observer 190 may be, for example, a human operator or passenger of a vehicle, or an electrical and/or mechanical optical reception device (e.g., a still image, a moving-image camera, etc.). Graphical information may include visual display of objects and/or texts. In one embodiment, the graphical information may include displaying images or a sequence of images to provide video or animations. In one embodiment, displaying the graphical information may include moving objects and/or text across the screen or changing or providing animations to the objects and/or text. The animations may include changing the color, shape and/or size of the objects or text. In one embodiment, displayed objects and/or text may be moved between the display screens 130-160. The distances between the display screens 130-160 may be set to obtain a desired depth perception between features displayed on the display screens 130-160.

In one embodiment, a position of one or more of the display screens 130-160 may be adjustable by an observer 190 in response to an input. Thus, an observer 190 may be able to adjust the three dimension depth of the displayed objects due to the displacement of the display screens 130-160. A processing system may be configured to adjust the displayed graphics and gradients associated with the graphics in accordance with the adjustment.

Each of the display screens 130-160 may be configured to receive data and display, based on the data, a different image on each of the display screens 130-160 simultaneously. Because the images are separated by a physical separation due to the separation of the display screens 130-160, each image may be provided at a different focal plane and depth is perceived by the observer 190 in the displayed images. The images may include graphics in different portions of the respective display screen.

While not illustrated in FIG. 1, the display system 100 may include one or more projection screens, one or more diffraction elements, and/or one or more filters between an observer 190 and the projection screen 160, between any two projection screens 130-160, and/or the projection screen 130 and the light source 120.

A head and/or eye movement tracking unit may be integrated into an MLD system such as that shown in FIG. 1. For example, such a unit can be incorporated in the first display screen in a manner that is visible or invisible to the viewer.

U.S. patent application Ser. No. 15/359,732 filed on Nov. 23, 2016, the contents of which is incorporated herein in its entirety, describes an example MLD that may be used in some example embodiments. U.S. application Ser. No. 15/409,711 filed on Jan. 19, 2017, which is incorporated by reference in its entirety, describes an example MLD adapted to reduce moire interference. U.S. Provisional Patent Application No. 62/469 filed on Mar. 9, 2017, which is also herein incorporated in its entirety, provides an MLD adapted for improved reliability and which may be used in some embodiments.

As noted above, it is important that content that is intended to be as such "line up" when corresponding portions of images are displayed on the respective layers of an MLD. When developing MLD-based content that appears to exist between the discrete layered displays, however, some of that content often 'breaks' due to positionally identical content not lining up. This is caused by the physical depth of the displays and inherent parallaxing from such a construction. By moving and resizing content when it exists 'between the layers' in this fashion, a rough solution can be built, however this suffers from sweet spots—and the effect is likely to break (e.g., not work as intended) when the user examines the content from even a slight variant angle (e.g., an off-normal angle).

To resolve issues with creating content that appears between layers when viewed off normal, embodiments of this disclosure use head tracking to algorithmically and automatically correctly project content to appear to exist between layers without sweet spots.

Example embodiments enable rendering of content on and between two MLD layers, such that the content is correctly rendered from the perspective angle of the viewer. To achieve this, the content must be both rendered from the viewer's perspective, and then skewed via their projection matrices. Below, a breakdown of steps that lead to achieving this effect is provided.

Figure 2:
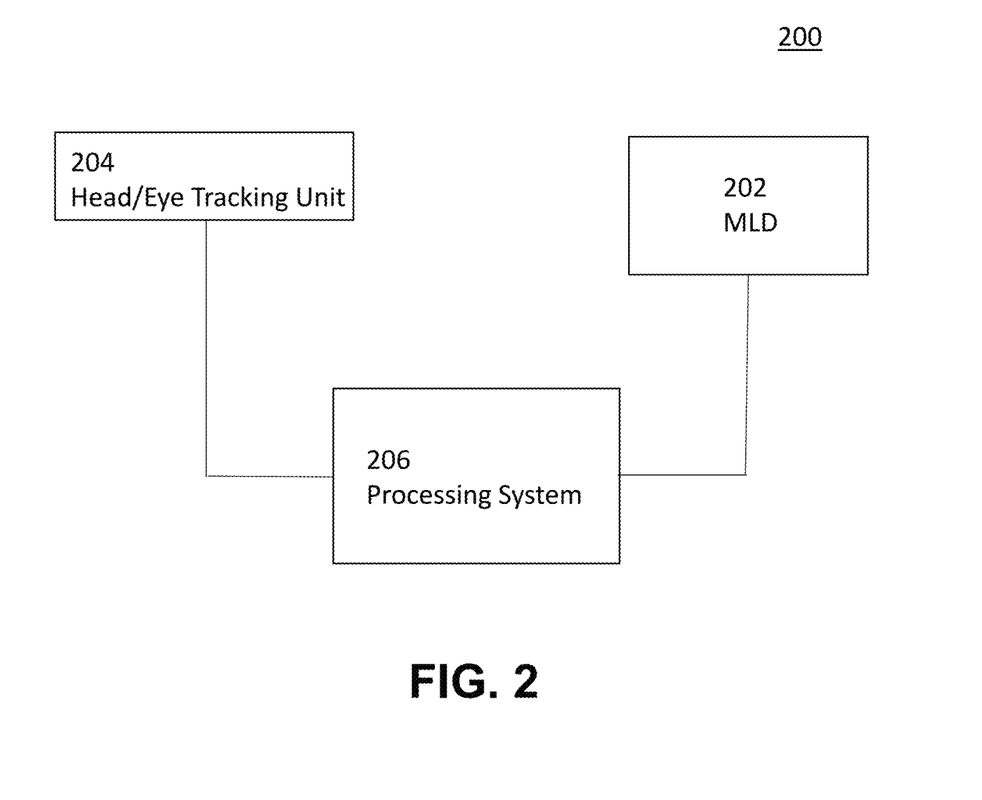
FIG. 2 schematically illustrates a display system according to some example embodiments of the present disclosure.

FIG. 2 schematically illustrates an example display system with an MLD 202, a head/eye tracking unit 204, and a processing system 206. MLD 202 can be an MLD such as the MLD 100 described above in relation to FIG. 1. The head/eye tracking unit 204 tracks movements of one or more of the head and eyes of a viewer, and communicates the movement information to processing system 206. In some embodiments, the tracking unit 204 may be integrally incorporated in, and within a single housing with, the MLD 202. In some embodiments, the tracking unit 204 may be separate from the MLD 202 and statically attached to something so that it can detect movements of the viewer's head and/or eyes. In yet other example embodiments, the tracking unit 204 is attached to the viewer's head or otherwise "worn" by the viewer. The communication between the tracking unit 204 and the MLD 202 and/or communication between the tracking unit 204 and processing system 206 may be wireless or wired using any form of compatible communication. The processing system 206 is configured to perform image generation for displaying on MLD 202, and upon receiving head/eye movement information of a viewer, may adjust aspects such as, but not limited to, color saturation and/or gradients of display fields of images that are to be displayed on any of the respective display screens of MLD 202.

Some example embodiments proceed by first generating a virtual "simulacrum"—a virtual recreation of the real-world environment of the viewer—and then using images displayed in the simulacrum to, if necessary, correct the rendering of the images to the real-world display in the MLD.

Figure 3:
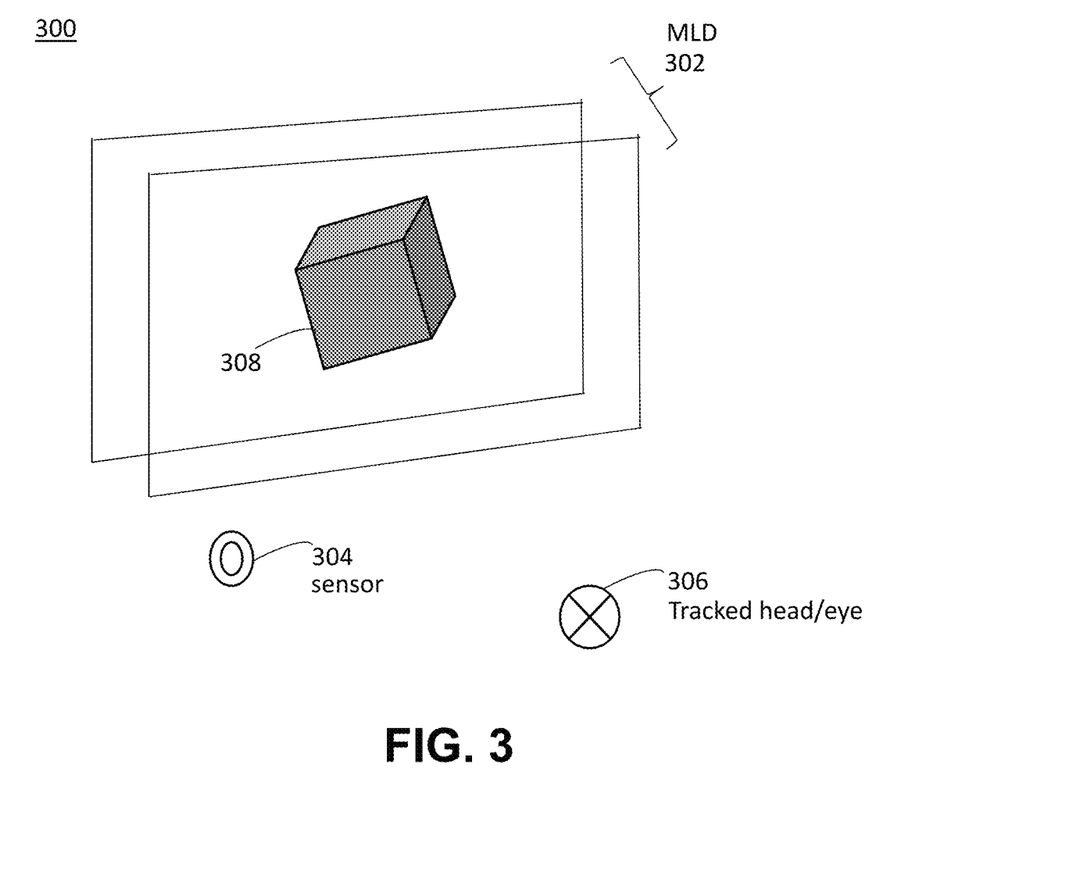
FIG. 3 schematically illustrates a virtual simulacrum according to some example embodiments of the present disclosure.

FIG. 3 schematically illustrates a virtual simulacrum 300 according to some example embodiments of the present disclosure. The virtual simulacrum may be generated on a processor such as processor 206. 3D content 308 (e.g., a cube), is placed in the simulacrum MLD 302, with noted sensor 304 and tracked head 306 positions. To establish the tracked head positions within the simulacrum 300 the sensor position with respect to the physical MLD needs to be known. For example, in some embodiments, all positions (e.g., positions of the MLD, sensor and head/eyes) may be determined relative to the MLD. The sensor 304 position may be fixed (e.g., fixedly attached to the MLD and/or in the same housing as the MLD) or changeable (e.g., sensor is not fixedly attached to the MLD) in relation to the MLD. In some embodiments, the simulacrum may be based on a coordinate system with its origin at a predetermined position within the MLD.

Figure 4:
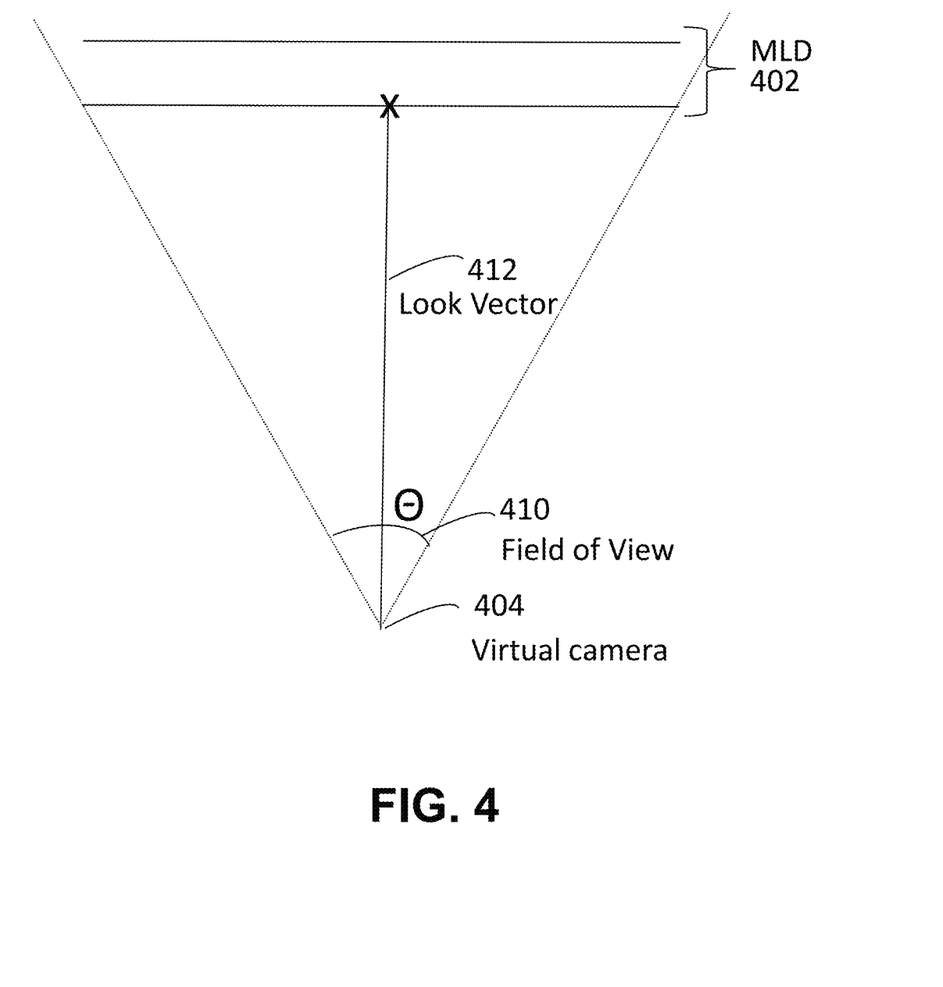
FIG. 4 schematically illustrates the camera positioned at the tracked head position according to some example embodiments of the present disclosure.

FIG. 4 schematically illustrates the virtual camera 404 positioned at, for example, the tracked head position 306 according to some example embodiments of the present disclosure. The virtual camera 404 has a field of view 410 on to the MLD 402. A look vector 412 to the center of the MLD may be mapped from the virtual camera 404.

Figure 5:
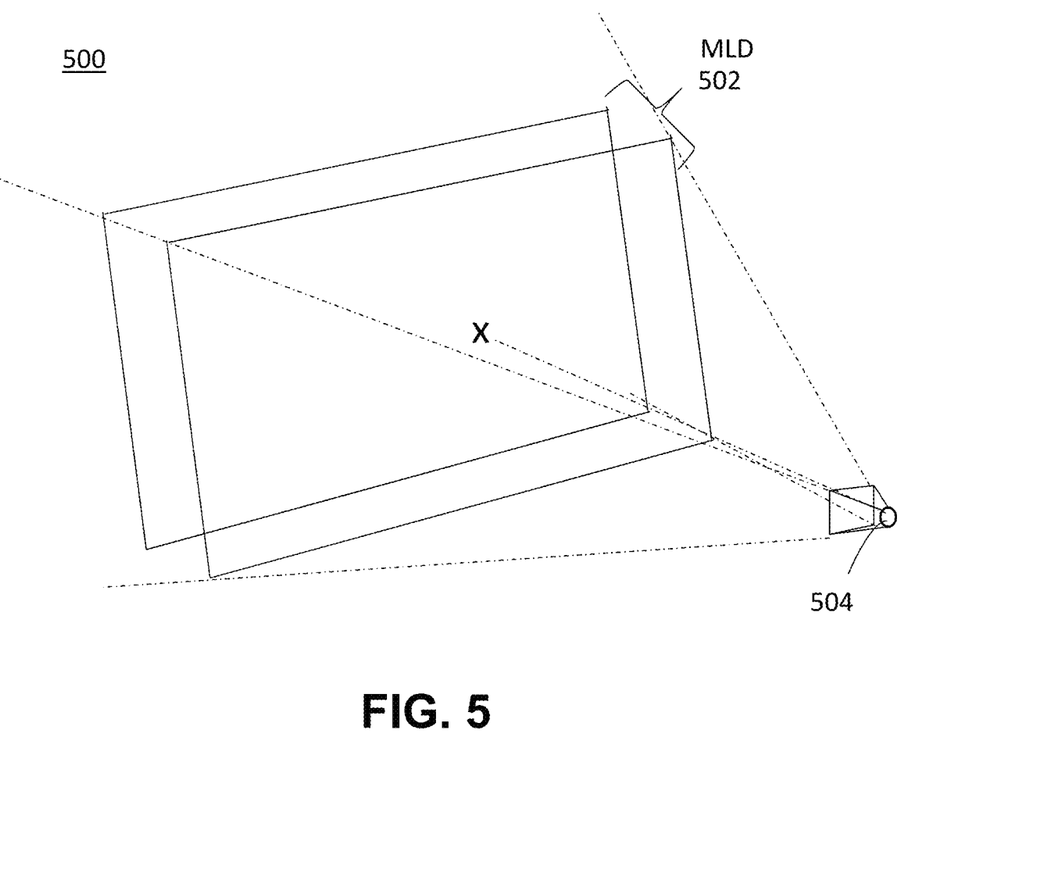
FIG. 5 schematically illustrates the camera angled to look at the center of the MLD display with corrected field of view according to some example embodiments of the present disclosure.
Figure 6A:
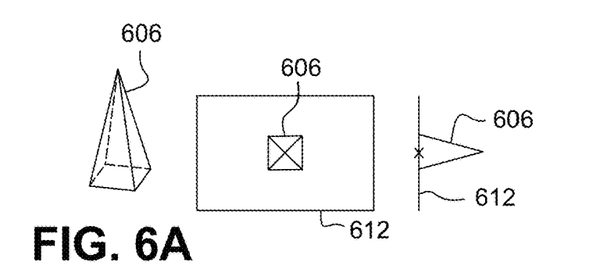
FIGS. 6A, 6B, 6C, 6D and 6E schematically illustrate content being perspectively rendered and then skewed by a projector onto the MLD, according to some example embodiments of the present disclosure.
Figure 6B:
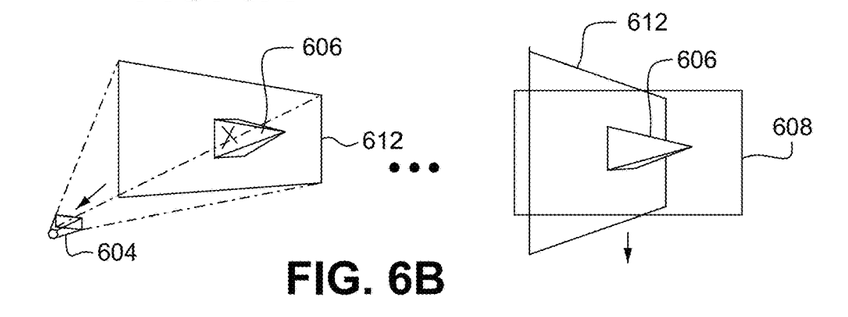
Figure 6C:
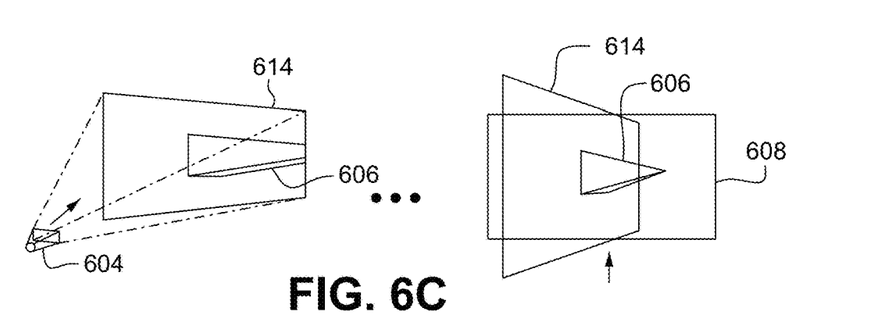
Figure 6D:
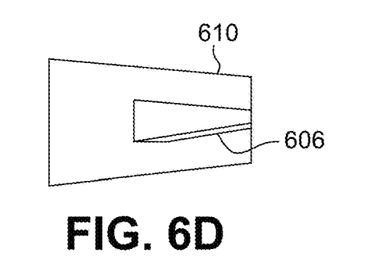
Figure 6E:
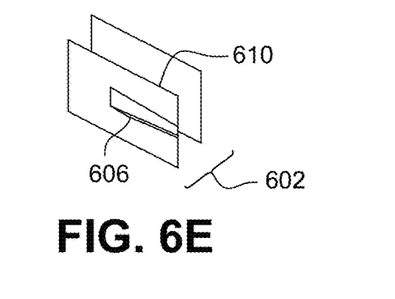

FIG. 5 schematically illustrates the virtual camera 404 of FIG. 4 when angled (angled camera position shown as 504) to look at the center of the MLD display 502 with corrected field of view according to some example embodiments of the present disclosure.

FIGS. 6A, 6B, 6C, 6D and 6E schematically illustrates the content 606 as viewed by a viewer at an angle (such as at the virtual camera position 604) in relation to a simulacrum 612. The content 606 is then skewed by a camera 604 onto a view 608. However, although it looks correct from the camera itself, view 608 looks skewed when drawn to the physical MLD. Therefore, according to some example embodiments of the present disclosure, the view 608 may be reskewed through projection along camera 604's view matrices to obtain the corrected view 610 on a mesh 614 which is ultimately displayed to the MLD 602, and which correctly renders three dimensional objects with respect to the current view angle of the viewer. When used to draw to both layers of the MLD, this technique can be used to align images displayed on, or across the different layers, regardless of the current view angle of the viewer.

Figure 7:
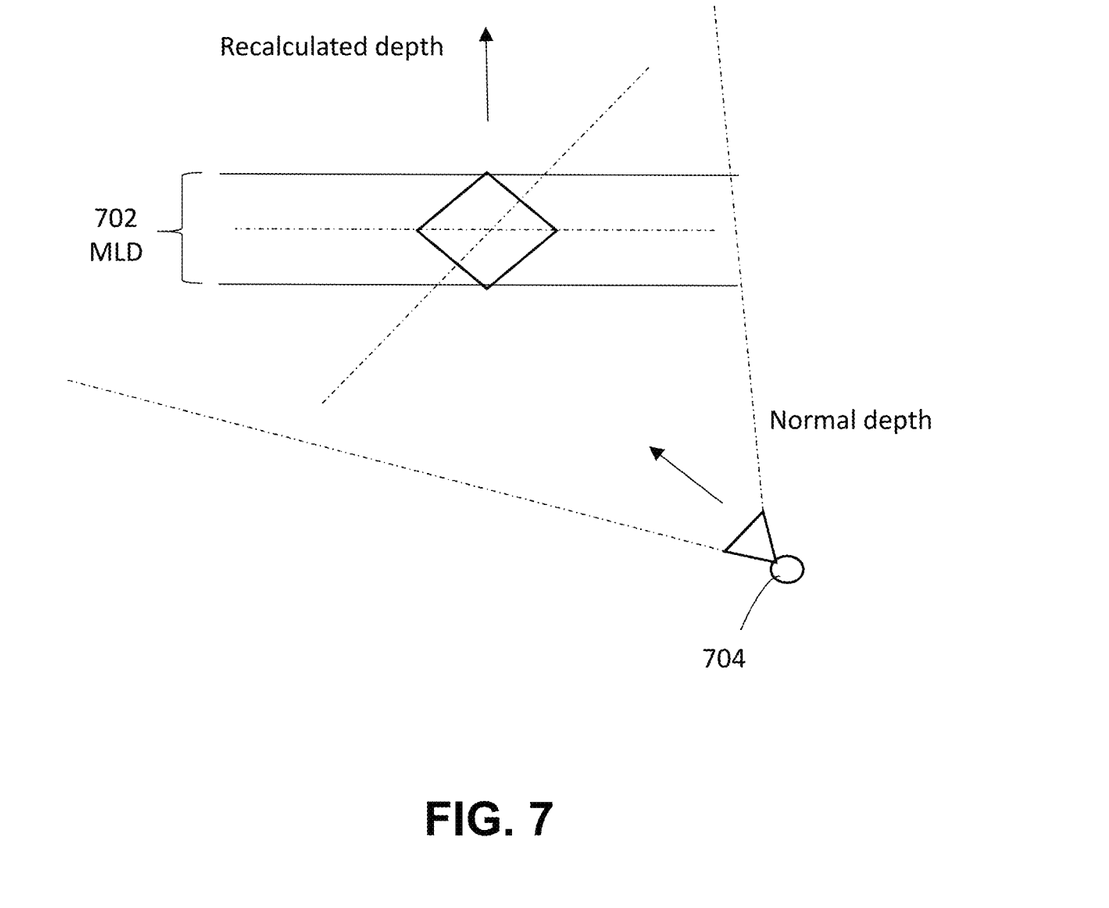
FIG. 7 illustrates a depth ma according to some example embodiments of the present disclosure.

FIG. 7 illustrates a depth map according to some example embodiments of the present disclosure. The depth map according to FIG. 7 provides for the depth of objects displayed on or between the layers of the MLD to be determined independently of the current viewpoint angle, whilst still retaining the perspective distortion of the current viewpoint. When combined with the content presentation techniques in FIG. 6, this depth map can encode the depth in the MLD for the presented object, and can be used to determine how it is rendered on, and between, the MLD layers. In example embodiments the depth can determine how opaque or transparent the content being displayed is on both layers simultaneously—i.e. a portion of an object that is determined via the depth map to be positioned against the back panel may be fully transparent on the front panel and fully opaque on the back panel, whilst a portion of an object that is determined to be between the panels in the simulacrum may be equally transparent on both front and back layers. This allows for dynamic gradients as described above to be algorithmically and automatically generated from three-dimensional shapes.

Figure 8:
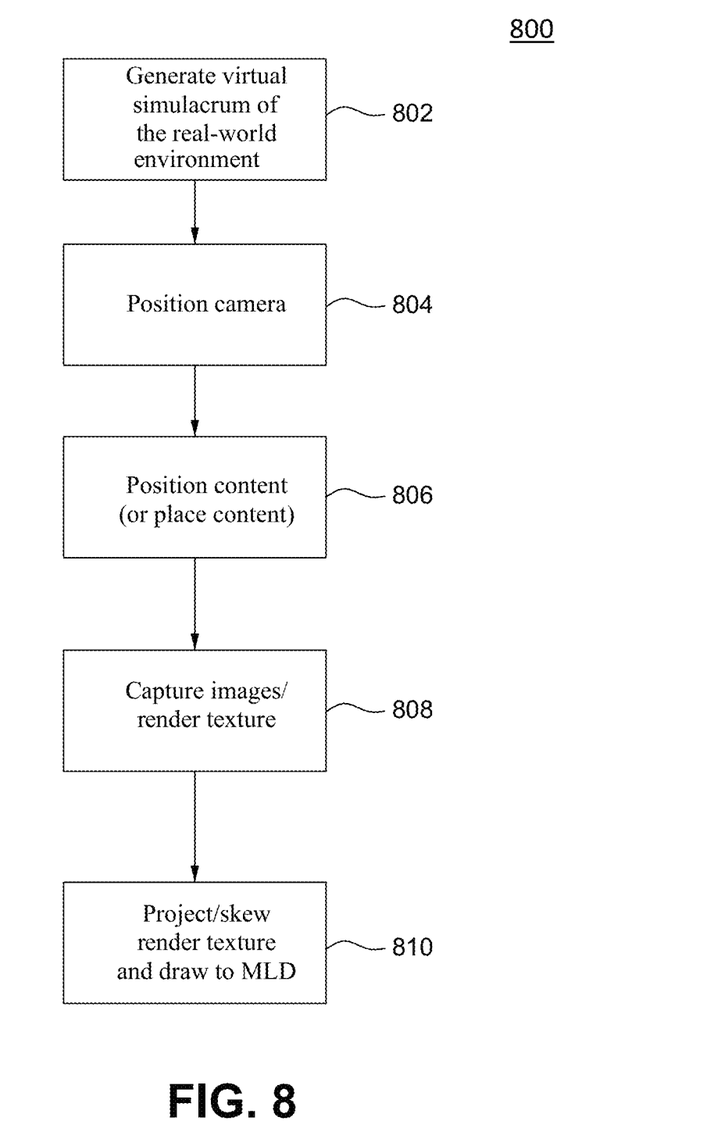
FIG. 8 illustrates a flowchart representing a method for displaying information on a multi-layer display system according to some example embodiments of the present disclosure.

FIG. 8 illustrates a process 800 for displaying information on a MLD system according to some example embodiments of the present disclosure. Process 800 may be performed by a processing system including one or more hardware processors and memory. For example, process 800 may be performed by a processing system of MLD system 100 shown in FIG. 1 and/or the display system 200 shown in FIG. 2. According to some example embodiments, process 800 includes operations 802-810. Persons of skill in the art will understand that, in some example embodiments, the order of operations of process 800 may be different, one or more operations may not be performed, concatenation of the operations and/or one or more additional operations may be performed.

After process 800 is entered, at operation 802 a 3D virtual re-creation of the real-world setup—henceforth referred to as a "perspective simulacrum", or simply "simulacrum" is assembled. FIG. 3 is a schematic illustration of an example simulacrum 300. The simulacrum holds both the accurate representation of the physical configuration of the MLD, and the head-tracking sensor position with accompanying tracked content correctly scaled to accurate dimensions. In this way, the simulacrum acts as a virtual duplicate of the real-world environment in which the MLD is being viewed. The head/eye position/movement information may be received from a head/eye tracking unit such as the one described above in relation to FIG. 2. As described in relation to FIG. 3, in some embodiments, the simulacrum may be defined in a coordinate space having its origin in the MLD. The simulacrum coordinate space may, in addition to determining the viewer's position (e.g., tracked head/eye position) in relation to the MLD, enable the determination of distance between each of the multiple display layers of the MLD and the viewer's position. In some embodiments, the movement information provides one or more of a starting coordinate and angle of orientation, and ending coordinate and orientation, rate of change/movement and direction, etc.

With the simulacrum constructed, at operation 804, a camera is positioned at the tracked head position, and its forward vector is angled to face the center of the MLD screen. For example, FIG. 4 shows a camera 504 positioned at the tracked head position shown in FIG. 3, and a look vector (forward vector) 412 from the camera 504 to the center of the screen of simulacrum MLD 402. The camera's up vector may be uniformly set to the world's vertical axis to remove any roll introduced, and its right vector may be calculated from the former two vectors. These vectors (e.g., the look vector (also referred to as "forward vector"), the up vector and the right vector), form the basis of the perspective camera's view matrices. In some embodiments, based on the distance to the simulacrum MLD, the camera then has its field of view set to the angle that enables it to fully capture the screen and its content. In other embodiments, its look vector may be an arbitrary vector in space, and/or its field of view fixed. As long as the camera is capable of capturing the content, the process is identical. Correcting and targeting the field of view or look vector simply enables a more efficient rendering process by minimizing the unnecessary empty space rendered. For example, in FIG. 4, the field of view 410 having an angle of θ enables the camera 404 to have a view of the entire screen of the MLD 402. Moreover, based on the simulacrum, the length of the look vector and, because the distances between the MLD layers at the center of the MLD screen are known, the distance from the viewer (or camera 504) to each of the MLD layers is also known.

At operation 810, one or more images are generated, comprised of or containing the final image matrices generated in operation 808, for simultaneously displaying on the respective display screens of an MLD such as the MLDs described in relation to FIGS. 1 and 2 above. Process 800 may occur while the MLD is displaying, using received display data, a first image on a first display screen, and a second image on a second display screen arranged in an overlapping manner with the first display screen. The received display data may be retrieved from memory coupled to a processing system and/or from another device. The display data may be received over a network which may be wireless. The received display data may include a plurality of images for display on different display screens simultaneously. Each of the images may include a graphic and/or a gradient portion. In one embodiment one or more of the images may include a plurality of graphics and each of the graphics may be a separate from each other. The display data may include a sequence of images (e.g., video) and/or text for display on the one or more display screens. Each of the images may include one or more of objects, text, and/or animations. The display data may be periodically or continuously received with updated information for display.

In one embodiment, the received display data may include a single image and the first and second images may be generated from the single received image. For example, the processing system may segment the received image to provide different portions of the received image to be displayed on the first and second display screens. The processing system may further generate gradients to be displayed on the first, second and third display, or arbitrary screens to display features with a perception of three-dimensions due to the displacement of the display screens. In exemplary embodiments, these generated gradients may be constructed using a depth map generated as in FIG. 7.

The first image may include a gradient area and the second image may include a gradient area that corresponds to the first gradient area. The first gradient area and the second gradient area may at least partially overlap. In another embodiment, the first gradient area and the second gradient area may be displayed without overlapping when viewed from a direction perpendicular to a focal plane of the first or second display screen, or when viewed from a position not similar to the head-tracked viewpoint. The first gradient area and the second gradient area may include portions of the same object in a scene, that when displayed in the separate screens as planar graphics with different gradients, is perceived by the observer as an object having a depth dimension.

At operation 806, content is placed in the simulacrum MLD. In some example embodiments, the content may be different from that generated at operation 806. The content is placed in front of, upon, within, or behind the simulacrum MLD (e.g. within display layers of the simulacrum MLD). For example, according to an example embodiment, a first image may be placed in a front display layer of the MLD and a second image may be simultaneously placed in a back display layer of the MLD (e.g., FIG. 3 illustrates a content 308 placed in the MLD 302 (e.g., may represent either the first or second display layer) within the simulacrum 300. In another embodiment, 3D content, prior to being projected on to different 2D images, may be placed on the simulacrum MLD. FIGS. 6A-6E illustrates an example content 606 placed on the simulacrum MLD 612 before any correction obtained, as seen from an example head/eye position at an angle. The camera (e.g. camera 504 positioned at the tracked head position 306) may then capture a continuous stream of images or a snapshot (both referred to as a render texture) of the content. This render texture may be used to accurately display what the content looks like from the viewer's perspective At operation 808, the render texture is then passed to a mesh that draws to the final display viewport. This mesh can cover the entirety of the possible renderable space, or can instead simply cover the area in which the content is expected to appear. However, to correctly reproject the content back onto the flat display, the capturing camera's view (e.g., view 608 shown in FIGS. 6A-6E) and its projection matrices relative to the simulacrum MLD 612 are required, and these can be used to reshape the content to be correctly drawn from the viewer's perspective. For example, as shown in FIGS. 6A-6E, camera 604 may be used to obtain the perspective view 608 and based on the view 608 and predetermined projection matrices in the simulacrum for the position of the camera 604, draw the captured image of content 606 to a mesh 614 to create the final product 610. This can then be handed to the MLD 602 for final rendering and image generation. Because the matrices required to project the content are inherently dependent on the location of the MLD's screen in relation to the viewer, in some exemplary embodiments rather than re-capturing content to correctly draw to the second (back) layer, the camera matrices are offset during the final projection to accommodate for displaying onto the deeper plane. By utilising the original camera's view and projection matrices, we can reconstruct the viewer's viewport in relation to the MLD screen, allowing for the captured image to be projected onto the mesh being rendered to the MLD via texture coordinate mapping. At this point, a depth map can be used in conjunction with the captured image to determine the opacity of what is rendered to one, or both screens (e.g. content that is deeper in the display is rendered as more opaque on the back layer than the front layer). When performed across both layers, the content will seamlessly 'blend' from the front layer to the back layer of the MLD, and appear as a continuous surface to the viewer. Example view 610 shown in FIG. 6A-6E illustrates the same content as in view 608 after being reskewed so that the correct alignment with aspects of the image drawn on to the first (front) layer of the MLD. Reskewing may include shifting and/or distorting the image for the second display layer and/or the image for the first display layer in accordance with the distance between the first and second MLD layers, and the distance and angle from the center of the simulacrum MLD to the tracked head/eye position. This alignment of images and/or objects among the multiple layers of the multi-layer display provides depth fusion for the content displayed on the multi-layer display while providing a three-dimensional effect. Although described through in these embodiments as rendering to a mesh, this process could simply perform the mathematical projection distortion and pass the resultant images directly to the MLD to be drawn, with or without other content.

Operation 808 thus, by projecting and reskewing images initially on the simulacrum as described above, renders content on the physical MLD in accordance with the viewer's perspective to render content on and between the two MLD layers, such that the content is correctly rendered from the perspective angle of the viewer.

In example embodiments, depth fusion content may use a depth map rendered from the correct perspective, and the depth values may be calculated in a variety of ways. For example, as shown in FIG. 7, the depth for displaying the image on the first display layer may be based on how far forward from the viewer's head/eye it is (corresponding to the camera 704 in FIG. 7) or in an exemplary embodiment it may use the distance into the screen (i.e., their z-depth). However, the displaying of the image on the second display layer may, in addition, account for depth based on the distance between the first and second display layers of the MLD. Also, in example embodiments, both the capturing and projecting camera matrices may be identical (i.e. both perspective, same field of view, etc.). Although these may not be identical in some embodiments, having them as identical may provide for faster computation of the renderings and more consistent views. Moreover, for the most accurate simulation of real depth, content may be encapsulated within the true physical depth of the MLD. Due to the inherent binocular depth cues of the MLD layers, ensuring that the generated objects' form does not extend much beyond the true physical depth is often utilized in exemplary embodiments to prevent conflicting depth cues between the content and its presentation. Still further, since objects statically placed between layers of the MLD may be less than optimal due to left eye/right eye conflicts, some embodiments may generate the respective images to reduce the number of objects in between layers. Even at small true physical depths between MLD layers, the inherent disparity between left eye/right eye views at regular viewing distances causes difficulty in creating perfectly aligned content across both MLD layers (as each eye functionally acts as a separate viewpoint). In exemplary embodiments, this can be somewhat resolved by accounting for the divergence of the viewpoints through laterally blurring content on one or more layers to accommodate for the different views.

FIGS. 10A-10E illustrates an exemplary embodiment of the schematic presented in FIG. 6A-6E by concatenating several operational steps to perform an optimized 'one-step' solution. Content 1006 is placed such that the distance between it and the MLD layer 1012 is known. Once placed, the viewer's position 1004 is used to project the vertices of the content 1006 to the plane 1012 along lines drawn from the position 1004. Once the content is 'squashed' to the layer 1012 it can be rendered and passed to the MLD 1002 for presentation.

Figure 9:
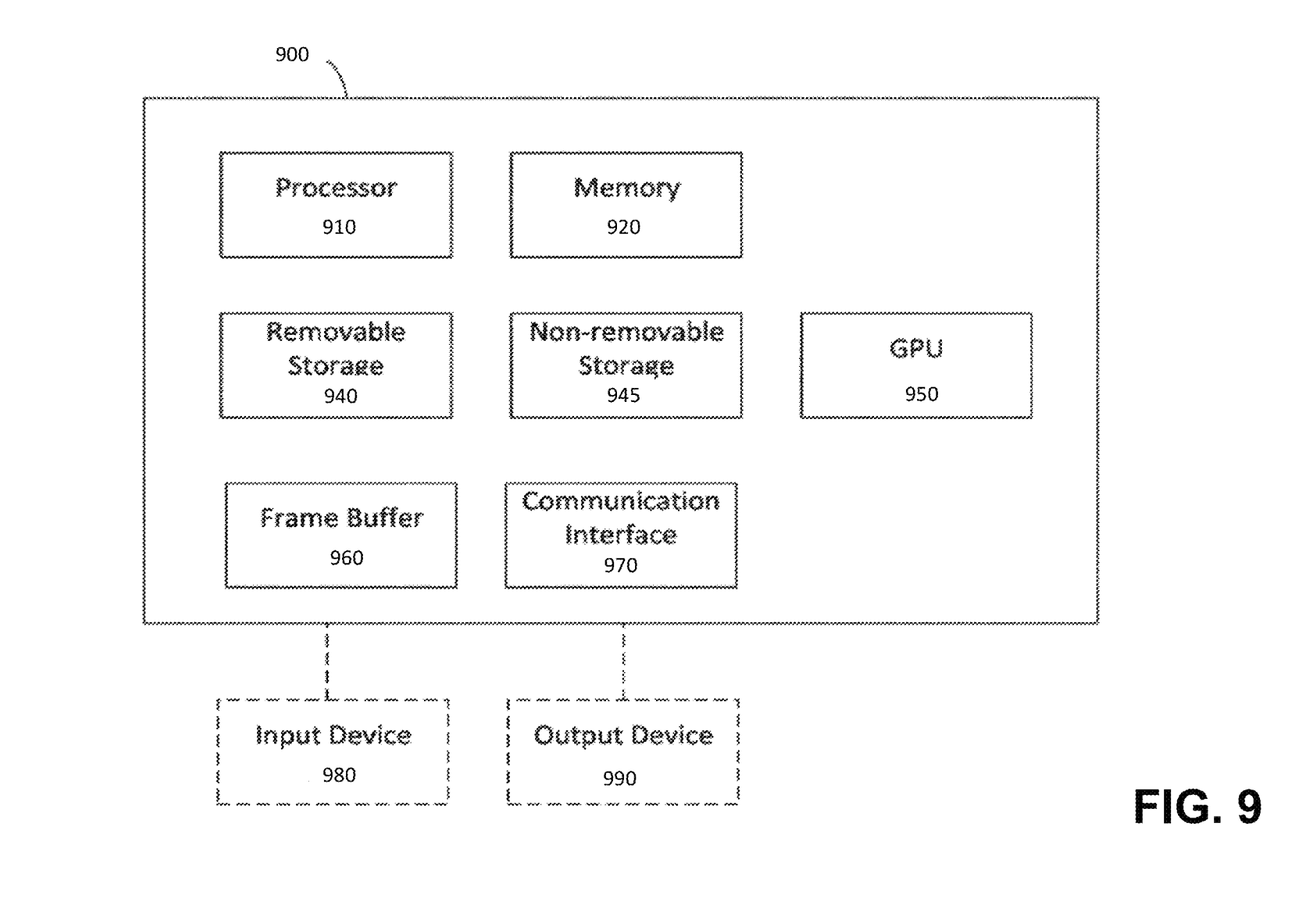
FIG. 9 illustrates an exemplary processing system using which embodiments of the present disclosure(s) may be implemented, such as FIGS. 1-8.
Figure 10A:
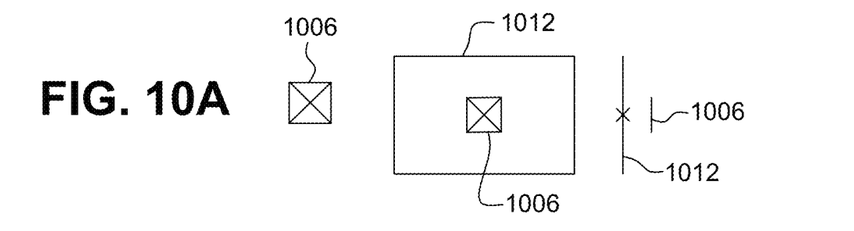
FIGS. 10A, 10B, 10C, 10D and 10E schematically illustrate content being perspectively skewed without rendering or projection through a one-step process, according to some example embodiments of the present disclosure.
Figure 10B:
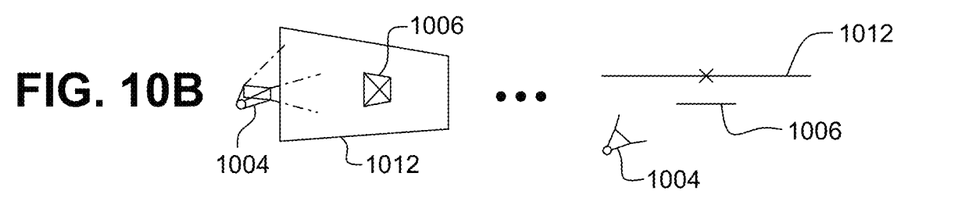
Figure 10C:
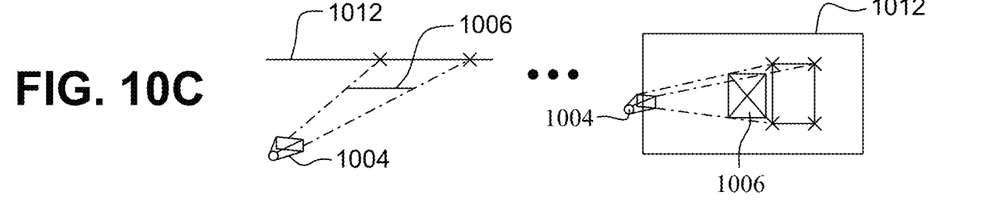
Figure 10D:
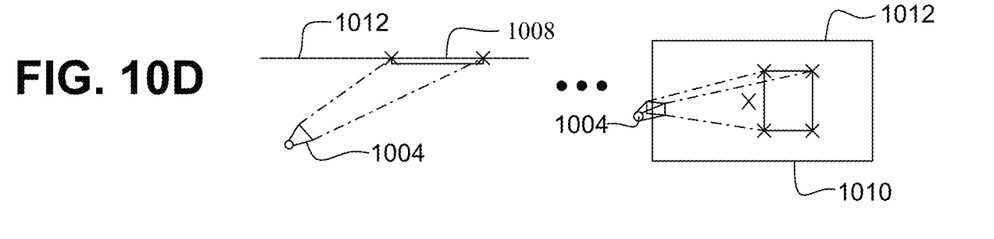
Figure 10E:
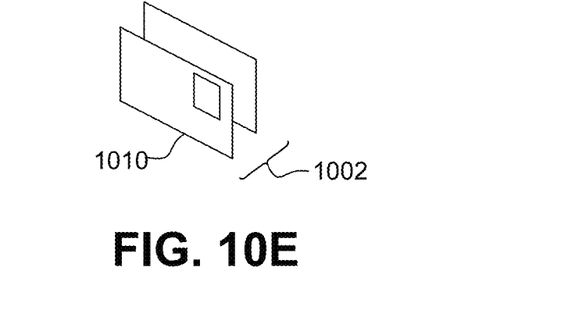

FIG. 9 illustrates an exemplary processing system 900 upon which embodiments of the present disclosure(s) may be implemented. The processing system 900 may include one or more processors 910 and memory 920, and may be used to implement processing system 206, MLD 202 and/or head/eye tracking unit. The processor 910 may comprise a central processing unit (CPU) or other type of processor. Depending on the configuration and/or type of computer system environment, the memory 920 may comprise volatile memory (e.g., RAM), non-volatile memory (e.g., ROM, flash memory, etc.), or some combination of the two. Additionally, memory 920 may be removable, non-removable, etc.

In other embodiments, the processing system may comprise additional storage (e.g., removable storage 940, non-removable storage 945, etc.). Removable storage 940 and/or non-removable storage 945 may comprise volatile memory, non-volatile memory, or any combination thereof. Additionally, removable storage 940 and/or non-removable storage 945 may comprise CD-ROM, digital versatile disks (DVD) or other optical storage, magnetic cassettes, magnetic tape, magnetic disk storage or other magnetic storage devices, or any other medium which can be used to store information for access by processing system 900.

As illustrated in FIG. 9, the processing system 900 may communicate with other systems, components, or devices via communication interface 970. Communication interface 970 may embody computer readable instructions, data structures, program modules or other data in a modulated data signal (e.g., a carrier wave) or other transport mechanism. By way of example, communication interface 970 may be couple to wired media (e.g., a wired network, direct-wired connection, etc.) and/or wireless media (e.g., a wireless network, a wireless connection utilizing acoustic, RF, infrared, or other wireless signaling, etc.).

Communication interface 970 may also couple the processing system 900 to one or more input devices 980 (e.g., a keyboard, mouse, pen, voice input device, touch input device, etc.) and/or output devices 990 (e.g., a display, speaker, printer, etc.). The input devices 990 may be used by an observer to manipulate the way information is displayed on an output device 990 and/or what information and/or graphics are displayed in different portion of the output device 990. In one embodiment, communication interface 970 may couple the processing system 900 to a display including three or more display panels arranged in an overlapping manner.

As shown in FIG. 9, a graphics processor 950 may perform graphics/image processing operations on data stored in a frame buffer 960 or another memory of the processing system. Data stored in frame buffer 960 may be accessed, processed, and/or modified by components (e.g., graphics processor 950, processor 910, etc.) of the processing system 900 and/or components of other systems/devices. Additionally, the data may be accessed (e.g., by graphics processor 950) and displayed on an output device coupled to the processing system 900. Accordingly, memory 920, removable storage 940, non-removable storage 945, frame buffer 960, or a combination thereof, may comprise instructions that when executed on a processor (e.g., 910, 950, etc.) implement a method of processing data (e.g., stored in frame buffer 960) for improved display quality on a display.

As shown in FIG. 9, portions of the present invention may be comprised of computer-readable and computer-executable instructions that reside, for example, in a processing system 900 and which may be used as a part of a general purpose computer network (not shown). It is appreciated that processing system 900 is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

An example embodiment provides a multi-layer display (MLD) system for displaying three-dimensional images. The MLD system comprises a MLD unit and a processing system communicatively coupled to the MLD unit and a head and/or eye tracking device. The processing system comprises at least one processor and memory. The processing system is configured to obtain one or more images, and to detect head and/or eye position of a viewer based on information received from the head and/or eye tracking device. The processing system also generates a virtual simulacrum representing at least the MLD unit and the detected position in relation to the MLD unit. The processing system, using the generated virtual simulacrum, determines display parameters for displaying an image on the MLD unit, and displays, on the MLD unit, at least one image based on the obtained one or more images based on the display parameters.

The MLD system according to the previous paragraph wherein the MLD unit comprises a plurality of display layers including at least first and second display layers arranged in a substantially parallel and overlapping manner, and wherein the processing system is further configured to: generate, from at least one of the obtained one or more images, a first image for displaying on the first display layer and a second image for simultaneously displaying on the second display layer; adjust at least one of the first image or the second image using the determined display parameters; and simultaneously display, after the adjusting, the first image on the first display layer and the second image on the second display layer.

The MLD system according to the previous two paragraphs, wherein said adjusting at least one of the first image or the second image using the determined display parameters includes reskewing, reshaping and/or resizing at least one of the first or second image.

The MLD system according to the previous three paragraphs, wherein the processing system is further configured to determine the display parameters based upon a distance between the first and second display layers.

The MLD system according to the previous four paragraphs, wherein the processing system is further configured to determine the display parameters based upon at least one of a distance and an angle of the detected position in relation to a center of a screen of the MLD unit.

The MLD system according to the paragraph three paragraphs above this paragraph, wherein the reskewing, reshaping and/or resizing at least one of the first or second image is performed based upon one or more projected images based upon a virtual MLD unit and a virtual camera represented in the virtual simulacrum.

The MLD system according to the previous paragraph, wherein the processing system is further configured to, using the generated virtual simulacrum, determine a perspective view based on the detected position, project the perspective view to the virtual MLD unit using the virtual camera, reskew the projected view to align aspects in the first display layer and the second display layer, and to perform said determining the display parameters according to the projecting and/or the reskewing.

MLD system according to the previous paragraph, wherein the processing system is further configured to perform the required viewer projection and distortion in one concatenated operation.

The MLD system according to the previous two paragraphs, wherein at least one of the projecting and/or the reskewing is based on a projection matrix associated with the virtual camera and/or a depth map associated with the virtual MLD unit.

The MLD system according to the previous eight paragraphs, wherein the processing system is configured to perform said obtaining the one or more images concurrently with the detecting.

The MLD system according to the previous nine paragraphs, wherein the MLD unit further comprises a light source configured to provide light to at least one of the display screens.

The MLD system according the previous ten paragraphs, wherein the head and/or eye tracking device is attached to the MLD unit.

The embodiments, as described above, provide for displaying three-dimensional imagery on an MLD in a manner that the images and/or objects displayed on the different layers of the MLD are appropriately "fused" to compensate for the depth between the different screens of the MLD when viewed from any angle. This enables a user to view the imagery displayed on the MLD from any angle without being limited to sweet spots.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s).

The invention claimed is:

1. A multi-layer display (MLD) system for displaying three-dimensional images:
   a multi-layer display unit; and
   a processing system communicatively coupled to the multi-layer display unit and a head and/or eye tracking device, and comprising at least one processor and memory, the processing system being configured to:
   obtain one or more images;
   detect head and/or eye position of a viewer based on information received from the head and/or eye tracking device;
   generating a virtual simulacrum representing at least the multi-layer display unit and the detected position in relation to the multi-layer display unit;
   using the generated virtual simulacrum, determine display parameters for displaying an image on the multi-layer display unit;
   display, on the multi-layer display unit, at least one image based on the obtained one or more images based on the display parameters;
   wherein the processing system is further configured to, using the generated virtual simulacrum, determine a perspective view based on the detected position, project the perspective view to the virtual multi-layer display unit using the virtual camera, reskew the projected view to align aspects in the first display layer and the second display layer, and to perform said determining the display parameters according to the projecting and/or the reskewing.

2. The multi-layer display system according to claim 1, wherein the multi-layer display unit comprises a plurality of display layers including at least first and second display layers arranged in a substantially parallel and overlapping manner, and
   wherein the processing system is further configured to:
   generate, from at least one of the obtained one or more images, a first image for displaying on the first display layer and a second image for simultaneously displaying on the second display layer;
   adjust at least one of the first image or the second image using the determined display parameters; and
   simultaneously display, after the adjusting, the first image on the first display layer and the second image on the second display layer.

3. The multi-layer display system according to claim 2, wherein said adjusting at least one of the first image or the second image using the determined display parameters includes reskewing, reshaping and/or resizing at least one of the first or second image.

4. The multi-layer display system according to claim 3, wherein the processing system is further configured to determine the display parameters based upon a distance between the first and second display layers.

5. The multi-layer display system according to claim 4, wherein the processing system is further configured to determine the display parameters based upon at least one of a distance and an angle of the detected position in relation to a center of a screen of the multi-layer display unit.

6. The multi-layer display system according to claim 2, wherein the processing system is configured to perform said obtaining the one or more images concurrently with the detecting.

7. The multi-layer display system according to claim 2, wherein the multi-layer display unit further comprises a light source configured to provide light to at least one of the display screens.

8. The multi-layer display system according to claim 3, wherein the reskewing, reshaping and/or resizing at least one of the first or second image is performed based upon one or more projected images based upon a virtual multi-layer display unit and a virtual camera represented in the virtual simulacrum.

9. The multi-layer display system according to claim 1, wherein at least one of the projecting and/or the reskewing is based on a projection matrix associated with the virtual camera associated with the virtual multi-layer display unit.

10. The multi-layer display system according to claim 1, wherein the head and/or eye tracking device is attached to the multi-layer display unit.

11. A method for displaying three-dimensional images on a multi-layer display (MLD) system comprising a multi-layer display unit and a processing system having at least one processor and memory, the method comprising:
    obtaining one or more images;
    detecting head and/or eye position of a viewer based on information received from a head and/or eye tracking device;
    generating a virtual simulacrum representing at least the multi-layer display unit and the detected position in relation to the multi-layer display unit;
    using the generated virtual simulacrum, determine display parameters for displaying an image on the multi-layer display unit;
    display, on the multi-layer display unit, at least one image based on the obtained one or more images based on the display parameters; and
    using the generated virtual simulacrum, determine a perspective view based on the detected position, project the perspective view to the virtual multi-layer display unit using the virtual camera, reskew the projected view to align aspects in the first display layer and the second display layer, and to perform said determining the display parameters according to the projecting and/or the reskewing.

12. The method according to claim 11, further comprising:
    generating, from at least one of the obtained one or more images, a first image for displaying on a first display layer on a first layer of the multi-layer display unit and a second image for simultaneously displaying on a second display layer arranged in a substantially parallel and overlapping manner to the first display layer;
    adjusting at least one of the first image or the second image using the determined display parameters; and
    simultaneously displaying, after the adjusting, the first image on the first display layer and the second image on the second display layer.

13. The method according to claim 12, further comprising utilizing a depth map to affect the overlapping manner of the first and second displayed images through manipulation of transparency.

14. The method according to claim 12, wherein said adjusting at least one of the first image or the second image using the determined display parameters includes reskewing, reshaping and/or resizing at least one of the first or second image.

15. The method according to claim 11, wherein determining display parameters for displaying an image on the multi-layer display unit comprises:
    logically extending straight lines from the detected head/eye position to a plurality of vertices of a content in the one or more images such that the straight lines are incident on to a plane of the simulacrum;
    displaying, after the logically extending, the plane on the second display layer.

16. A non-transitory computer readable storage medium storing computer program instruction which, when executed by a processor of a multi-layer display (MLD) system comprising a multi-layer display unit for displaying three-dimensional images, causes the multi-layer display system to perform operations comprising:
    obtaining one or more images;
    detecting head and/or eye position of a viewer based on information received from a head and/or eye tracking device;
    generating a virtual simulacrum representing at least the multi-layer display unit and the detected position in relation to the multi-layer display unit;
    using the generated virtual simulacrum, determine display parameters for displaying an image on the multi-layer display unit;
    display, on the multi-layer display unit, at least one image based on the obtained one or more images based on the display parameters; and
    using the generated virtual simulacrum, determine a perspective view based on the detected position, project the perspective view to the virtual multi-layer display unit using the virtual camera, reskew the projected view to align aspects in the first display layer and the second display layer, and to perform said determining the display parameters according to the projecting and/or the reskewing.

* * * * *